United States Patent
Li et al.

(10) Patent No.: US 8,952,558 B2
(45) Date of Patent: Feb. 10, 2015

(54) WIND GENERATING DEVICE

(75) Inventors: Aidong Li, Nantong (CN); Hongyan Ding, Nantong (CN); Xuanxu Huang, Nantong (CN)

(73) Assignee: Jiangsu Daoda Offshore Wind Construction Technology Co., Limited, Nantong (CN)

( * ) Notice: Subject to any disclaimer, the term of this patent is extended or adjusted under 35 U.S.C. 154(b) by 0 days.

(21) Appl. No.: 13/386,793

(22) PCT Filed: Sep. 29, 2010

(86) PCT No.: PCT/CN2010/001517
§ 371 (c)(1),
(2), (4) Date: Jul. 30, 2013

(87) PCT Pub. No.: WO2011/106919
PCT Pub. Date: Sep. 9, 2011

(65) Prior Publication Data
US 2013/0300123 A1    Nov. 14, 2013

(51) Int. Cl.
*F03D 9/00* (2006.01)
*F03D 1/02* (2006.01)

(52) U.S. Cl.
CPC *F03D 9/002* (2013.01); *F03D 1/02* (2013.01); *F05B 2240/2213* (2013.01); *F05B 2260/96* (2013.01); *Y02E 10/725* (2013.01)
USPC .............................................. 290/44; 290/55

(58) Field of Classification Search
USPC ........................................ 290/44, 55
See application file for complete search history.

(56) References Cited

U.S. PATENT DOCUMENTS

| | | | |
|---|---|---|---|
| 4,710,100 A | 12/1987 | Laing et al. | |
| 5,146,096 A | 9/1992 | McConachy | |
| 5,182,458 A * | 1/1993 | McConachy | 290/55 |
| 7,726,911 B1 * | 6/2010 | Dempster | 405/210 |
| 2008/0067816 A1 * | 3/2008 | Garzmann | 290/55 |
| 2010/0140955 A1 * | 6/2010 | Casazza et al. | 290/55 |
| 2011/0084491 A1 * | 4/2011 | Kassner | 290/55 |

FOREIGN PATENT DOCUMENTS

| | | |
|---|---|---|
| CN | 1633559 A | 6/2005 |
| CN | 201250765 Y | 6/2009 |
| CN | 101737261 A | 6/2010 |
| DE | 830180 C | 1/1952 |
| DE | 4236092 A1 | 4/1994 |
| JP | 2004285968 A | 10/2004 |
| WO | WO 2005/008062 A1 | 1/2005 |

* cited by examiner

OTHER PUBLICATIONS

Supplementary European Search Report, European Patent Office, European Patent Application No. 10846838.0 corresponding to PCT/CN2010001517, dated May 16, 2013, 6 pages.

*Primary Examiner* — Tho D Ta
(74) *Attorney, Agent, or Firm* — Cesari and McKenna, LLP

(57) ABSTRACT

The present invention discloses a wind power generating device, comprising a tower column and a first wind generating set. The first wind generating set is installed at a position on the tower column near the top, and the first wind generating set generates a first torque on the tower column during rotation for power generating. At least one second wind generating set is installed at a position on the tower column below the top, the second wind generating set generates a second torque on the tower column during rotation for power generating, and the second torque at least partially counteracts with the first torque. With the wind power generating device of the present invention, a high power wind power generation is achieved and the wind power generating device operates stably.

12 Claims, 2 Drawing Sheets

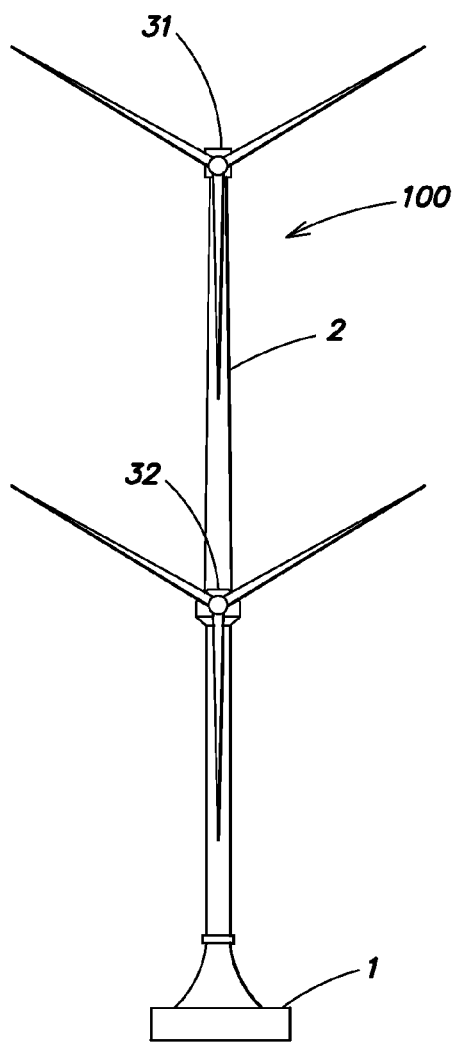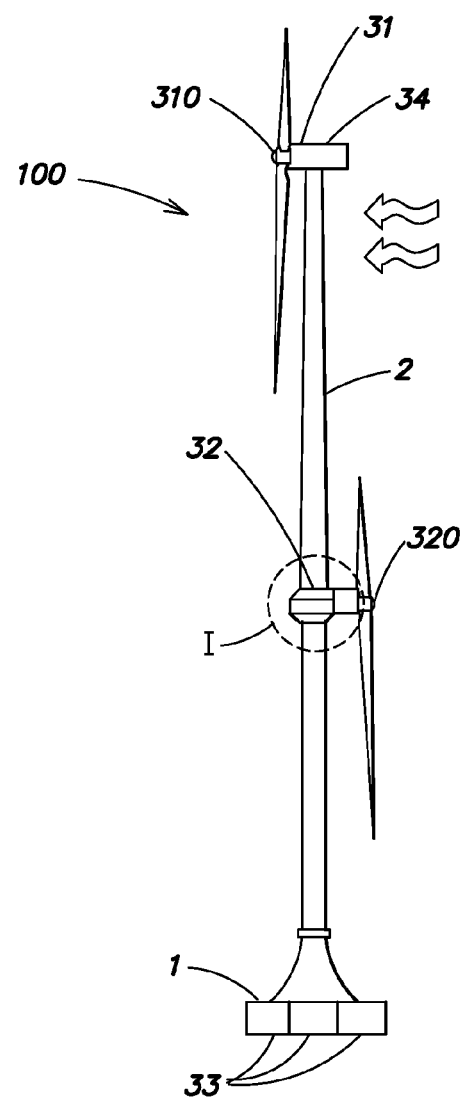
FIG. 1
FIG. 2

WIND GENERATING DEVICE

RELATED APPLICATION

The present application is a 371 of International Application No. PCT/CN2010/001517 filed on Sep. 29, 2010 by Aidong Li et al., for a WIND GENERATING DEVICE, which is hereby incorporated by reference in its entirety.

FIELD OF THE INVENTION

The present invention relates to the technical field of wind power generation, and in particular to a wind power generating device.

BACKGROUND

With the continuous maturing of wind power generating technology and the continuous reduction of wind power generation cost, wind power generation has become one of the main sources of electric energy consumption. Wind power generation produces electric energy mainly by means of a wind generating set under the effect of wind. Wind power generation is an economical renewable energy which is easy to realize a large scale commercialization; besides, it pertains to a green and clean energy. With wind power generation, not only the abundant natural wind energy resource can be utilized to benefit human kind, but also the consumption of mineral fuels such as coal and oil can be reduced, thus alleviating the pressure of extreme energy shortage. In addition, the influence of environmental pollution such as dust, acid rain and greenhouse effect brought by fuel-burning power generation on the climate can be reduced, thus facilitating the protection of human living environment.

As the wind generating set gradually develops towards a trend of high power, currently, the research of the wind generating set is mainly directed to the improvement of installing power of a single machine. By increasing the blade length of the wind generating set, the sweeping area can be increased and the wind power generating capacity of the single machine can be improved. However, as the power further increases, the diameter and weight of the blade continuously increase accordingly, and the weight of the wind generating set itself will also increase considerably; as a result, the difficulties in manufacturing various components and in installing the whole machine will increase significantly, thus restricting the potential of further enlarging the wind generating set.

Chinese Invention Patent Application Publication No. CN101737261A discloses a multi-wind wheel wind power generator, which comprises a frame, a generator, a supporting rod, wind wheels, a wind rudder and a plane bearing that enables the wind wheels to rotate in all directions. A plurality of wind wheels are installed on the frame by means of one or more supporting rods. The wind blows the wind wheels to rotate so that the kinetic energy of wind is transformed into mechanical energy; each wind wheel drives a rotor of the generator to rotate by driving a driving shaft installed in the support rod and cuts the magnetic field of a stator to produce electrical current, thus transforming mechanical energy into electric energy and driving the generator to produce electricity. Since the plurality of wind wheels are installed on the frame, one generator is driven commonly by the plurality of wind wheels so that the diameter of the wind wheel is reduced; the cooperation of the plurality of wind wheels increases the windward area and improves power generating efficiency. However, since the plurality of wind wheels co-drives one generator to produce electricity, the requirement on the capacity of the generator is relatively high; moreover, a generator having a high capacity has undoubtedly increased the size of the generator, which is adverse to the overall arrangement and installation of cabin. Further, the plurality of wind wheels will face the same one direction whether they are installed on the frame by means of one support rod or a plurality of support rods. Therefore, during the operation of the plurality of wind wheels, identical torques will be induced on the frame; accordingly, the mechanical stability of the frame is low and the safety and reliability are poor.

Therefore, there exists an urgent need to provide an improvement to overcome the above problems in the prior art.

SUMMARY OF THE INVENTION

The technical problem to be solved by the present invention is to provide a wind power generating device which ensures a stable operation of the whole wind power generating device while realizing a high power output.

In order to achieve the above object of the invention, the present invention adopts the following technical solutions:

An aspect of the present invention provides a wind power generating device, comprising a tower column and a first wind generating set, wherein the first wind generating set is installed at a position on the tower column near the top, the first wind generating set generates a first torque on the tower column during rotation for power generating, said wind power generation device further comprises at least one second wind generating set which is installed at a position on the tower column below the top, the second wind generating set generates a second torque on the tower column during rotation for power generating, and the second torque at least partially counteracts with the first torque.

Preferably, one of the at least one second wind generating set is installed at the middle position of the tower column, and the first wind generating set and the second wind generating set rotate in opposite directions.

Preferably, the wind power generation device is provided with a balancer having a counterweight, the balancer balancing the operational bending moment of the wind power generation device by controlling the position of the counterweight.

Preferably, the gravity center of the first wind generating set is located in proximity of a tail portion of a cabin, and the gravity center of the second wind generating set is located in proximity of a head portion of the cabin.

Preferably, the wind power generation device is provided with a yawing system for controlling the directions of the first wind generating set and the second wind generating set; in case the first and the second wind generating sets are shut down, the yawing system controls the gravity center of the whole machine to deviate towards the direction of the coming wind.

Preferably, a hub of the first wind generating set is controlled to be located on the leeward face of the tower column, and a hub of the second wind generating set is controlled to be located on the windward face of the tower column.

Preferably, a mechanical connection between the second wind generating set and the tower column is realized by means of a bearing, and an electrical connection between the second wind generating set and the tower column is realized by means of an electrical brush, and the second wind generating set can rotate around the tower column toward any direction under the control of the yawing system.

Preferably, the hubs of the first and the second wind generating sets are both located on the leeward face of the tower column or the windward face of the tower column, and the interference between blades of the first and the second wind generating sets is reduced by synchronously controlling the rotation of the blades of the first and the second wind generating sets.

Preferably, an upper portion of a cabin of the second wind generating set is provided with a service hole for entry of maintainers.

Preferably, the tower column is a type of liftable tower column by means of which the heights of the first and the second wind generating sets are adjusted.

Preferably, the tower column is installed on a cylindrical foundation, and the foundation is a circular or polygonal complex cylindrical foundation with large dimension, or a combined structure of a plurality of complex cylindrical foundations.

Preferably, a vibration absorbing mat for absorbing and isolating vibratory energy is provided between the tower column and the cylindrical foundation and/or between the first and the second wind generating sets and the tower column.

Preferably, the cylindrical foundation is at least partly submerged into water, the interior of the cylindrical foundation comprises a plurality of tanks, the inner and outer surfaces of which are provided with various pressure sensors, and cabin pressure of at least a portion of the plurality of tanks is adjusted automatically according to signals of the pressure sensors, so as to keep the balance of the cylindrical foundation.

The wind power generation device according to the present invention can obtain a super high power wind generating set by connecting high power wind generating sets in series so that the difficulty in developing a super high power wind generating set is greatly reduced and the industrialization of a super high power wind generating set is made possible. Moreover, by designing at least two wind generating sets in which the rotational torques in operational state can be at least partially counteracted, the stability of the tower column is enhanced so that the operation of the whole wind power generation device becomes more stable and the overall mechanical stability of the wind power generation device is improved while achieving a high power output; thus, a higher power output can be obtained and the operation is safe and reliable.

The preferred particular embodiments will be described in detail hereinafter with reference to accompanying drawings so as to more clearly disclose other aspects and features of the invention. However, it is noted that the drawings are illustrated for explanation purpose only and should not be considered as limiting the scope of the invention since the scope is defined by the appended claims. It is also noted that unless otherwise stated, the drawings only strive to diagrammatically show the structure and flowchart described herein and are not necessarily drawn to scale.

BRIEF DESCRIPTION OF THE DRAWINGS

The technical solutions of the present invention will be further described in detail in connection with the accompanying drawings and particular embodiments, wherein:

FIG. 1 is a structural schematic view of a wind power generation device according to an embodiment of the invention;

FIG. 2 is a side schematic view of the wind power generation device shown in FIG. 1.

DETAILED DESCRIPTION OF THE INVENTION

Figure 3:
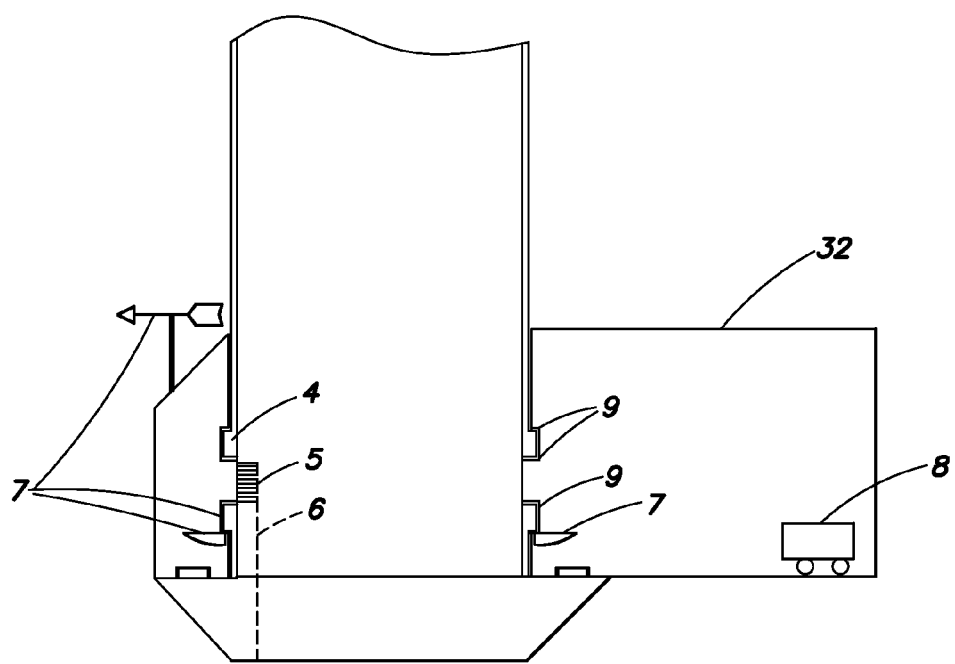
FIG. 3 is a partially enlarged sectional schematic view of the portion I of a second wind generating set shown in FIG. 2.

To make the objects, technical solutions and advantages of the present invention more apparent, the present invention will be further described in detail with reference to the accompanying drawings and in connection with particular embodiments hereinafter.

FIG. 1 is a structural schematic view of a wind power generation device according to an embodiment of the present invention. FIG. 2 is a side schematic view of the wind power generation device shown in FIG. 1. As shown in FIGS. 1 and 2, the wind power generating device 100 of the present invention comprises a cylindrical foundation 1, a tower column 2 installed on the cylindrical foundation 1 and a first wind generating set 31 and a second wind generating set 32 installed on the tower column 2.

The cylindrical foundation 1 can be a circular or polygonal complex cylindrical foundation with large dimension, or a combined structure of a plurality of complex cylindrical foundations. The cylindrical foundation 1 is at least partly submerged into water, the interior of the cylindrical foundation 1 comprises a plurality of tanks 33, the inner and outer surfaces of which are provided with various pressure sensors, cabin pressure of at least a portion of the plurality of tanks 33 is adjusted automatically according to signals of the pressure sensors, so as to keep the balance of the cylindrical foundation 1. The cylindrical foundation 1 combines a cylindrical structure, a gravity type structure and a stake structure so that it can endure complicated stress and load. The cylindrical foundation 1 can also be designed with different types of cylindrical foundation structure according to practical geological conditions of wind power plant.

The tower column 2 can be a conventional tower column or a liftable tower column. When the tower column 2 is a liftable tower column, the heights of the first wind generating set 31 and the second wind generating set 32 can be adjusted by adjusting the liftable tower column. The present invention enables the installation of at least two high power wind generating sets 31, 32 in the vertical height of the tower column 2 by increasing the strength and height of the tower column 2.

In order to decrease mutual influence between the wind generating sets and the influence on the tower column 2 and the cylindrical foundation 1, etc caused by vibration of the first and the second wind generating sets 31, 32, a vibration absorbing mat 9 for absorbing and isolating vibratory energy of the wind generating sets is provided between the tower column 2 and the cylindrical foundation 1 and/or between the first and the second wind generating sets 31, 32 and the tower column 2.

The first wind generating set 31 is installed at a position on the tower column 2 near the top, at least one second wind generating set 32 is installed at a position on the tower column 2 below the top. For clarity of illustration and convenience of description, in this particular embodiment, description will be given in a case where one second wind generating set 32 is installed at the middle position of the tower column 2. In other particular embodiments, the wind power generating device 100 of the present invention can be provided with more than two second wind generating sets 32, and the number and position of the second wind generating set 32 can be adjusted as required by actual wind power generation.

The first wind generating set 31 generates a first torque on the tower column 2 during rotation for power generating, and the second wind generating set 32 generates a second torque on the tower column 2 during rotation for power generating; moreover, the second torque at least partially counteracts with the first torque. In one particular embodiment, the first wind generating set 31 and the second wind generating set 32 rotate in opposite directions. Since the torques generated on the tower column 2 by the first wind generating set 31 and the second wind generating set 32 installed on the tower column 2 during rotational operation can partially or totally counteract with each other, the torque in operational and extreme conditions due to increase of heights of the first wind generating set 31 and the second wind generating set 32 as well as the series connection of at least two high power wind generating sets 31, 32 can be balanced, and the stability of the tower column 2 is enhanced so that the whole wind power generating device 100 operates more smoothly.

The wind power generating device 100 of the present invention is also provided with a balancer 8 having a counterweight and a yawing system 7 for controlling the directions of the first wind generating set 31 and the second wind generating set 32. The balancer 8 balances the operational bending moment of the wind power generating device 100 by controlling the position of the counterweight. In case the first and the second wind generating sets 31, 32 are shut down, the yawing system 7 controls the gravity center of the whole machine to deviate towards the direction of the coming wind.

In order to decrease mutual influence between the blades of the first and the second wind generating sets 31, 32 after the first and the second wind generating sets 31, 32 are connected in serial, the first wind generating set 31 is of a tailwind design, i.e., in operational state, a hub 310 of the first wind generating set 31 is controlled to be located on the leeward face of the tower column 2; while the second wind generating set 32 is of a headwind design, i.e., in operational state, a hub 320 of the second wind generating set 32 is controlled to be located on the windward face of the tower column 2; alternatively, the first wind generating set 31 and the second wind generating set 32 can be both of a tailwind design or a headwind design, i.e., the hubs of the first wind generating set 31 and the second wind generating set 32 are both located on the leeward face of the tower column 2 or the windward face of the tower column 2; the interference between the blades of the first and the second wind generating sets 31, 32 is reduced by synchronously controlling the rotation of the blades of the first wind generating set 31 and the second wind generating set 32.

On the other hand, in order to balance the bending moment of the wind generating sets 31, 32 caused by wind load, the wind generating sets 31, 32 can be of a design in which the gravity center is offset from the axis center of the tower column. The gravity center of the first wind generating set 31 is located in proximity of a tail portion of the cabin 34, and the gravity center of the second wind generating set 32 is located in proximity of a head portion of the cabin 34. In case the first and the second wind generating sets 31, 32 are shut down, the action of the yawing system controls the gravity center of the whole machine to deviate towards the direction of the coming wind. Alternatively, both the gravity centers of the first wind generating set 31 and the second wind generating set 32 are located in proximity of the head portion of the cabin 34, and the balancer balances the operational bending moment of the wind power generating device 100.

As shown in FIG. 3, a mechanical connection between the second wind generating set 32 and the tower column 2 is realized by means of a bearing 4, and an electrical connection between the second wind generating set 32 and a cable 6 inside the tower column 2 is realized by means of an electrical brush 5. Thus, the second wind generating set 32 can rotate around the tower column 2 toward any direction under the control of the yawing system 7. Moreover, the second wind generating set 32 smoothly transmits control signal and the generated electric energy to the tower column 2. An upper portion of the cabin 34 of the second wind generating set 32 is provided with a service hole (not shown) for entry of maintainers, and the tower column 2 is provided with a service hole (not shown) at an upper portion of the cabin 34 so that the maintainers can enter the tower column 2 through the top of cabin 34 for maintenance.

The installation of the first wind generating set 31 and the second wind generating set 32 can be performed by conventional separated hoisting or integral hoisting.

According to design requirements and wind resource condition of the region where wind power plant is located, the whole machine power W of the wind power generating device 100 to be designed is chosen, and appropriate mature machine models, i.e., the first wind generating set 31 (having a single machine power of Wa) and the second wind generating set 32 (having a single machine power of Wb), are chosen. Therefore, it can be derived that the whole machine power W of the wind power generating device 100 of the present invention is the sum of the single machine power of the first wind generating set 31 and the single machine power of the second wind generating set 32, namely, W=Wa+Wb. In the invention where two (or more) wind generating sets 31, 32 are installed in series on the single tower column 2, by increasing of height and strength of the tower column 2, the whole machine power of the wind generating sets is multiplied without adding any difficulty in manufacturing the wind generating sets 31 and 32, thereby improving the usage efficiency of wind energy.

The installation heights Ha and Hb of the first wind generating set 31 and the second wind generating set 32 are designed according to such conditions as wind resource, etc.

A load calculation is performed for the first wind generating set 31 and the second wind generating set 32, and the tower column 2 of the wind power generating device 100 of the present invention is designed. The upper portion of the tower column 2 employs a columnar single cylinder structure, and the lower portion may employ a columnar single cylinder structure or a truss structure.

The yawing system of the wind generating set around the tower column 2 is designed according to the load and the site environment.

The cylindrical foundation 1 of the wind power generating device 100 of the present invention is designed according to the chosen tower column 2 and the calculation of load as well as the geological conditions of wind power plant.

The installation solution is designed according to practical installation conditions; a separated hoisting manner can be adopted when appropriate; in case the height of a hoisting device is insufficient, the lifting tower column 2 can be adopted. The lifting tower column 2 can install the first wind generating set 31 and the second wind generating set 32 at a lower installation height.

When the installation is completed, an overall debugging and trial operation is performed for the first wind generating set 31 and the second wind generating set 32, which is then consigned for use.

The wind power generating device 100 of the present invention can obtain a super high power wind generating set by connecting single high power wind generating sets in series so that the difficulty in developing a super high power wind generating set is greatly reduced and the industrialization of a super high power wind generating set is made possible. Meanwhile, upper-level wind resource can be exploited to a greater degree and the usage efficiency of wind resource can be improved by increasing the height of the hub of the wind generating set.

As compared to the conventional wind power generating device, the wind power generating device 100 of the present invention has the following characteristics and beneficial effects:

As compared to exploiting a super high power wind generating set, the wind power generating device 100 of the present invention can make use of the technology of the existing mature wind generating set to the maximum degree so that the risk and difficulty in technology exploration are reduced.

As compared to a super high power wind generating set, the wind power generating device 100 of the present invention can make use of a high quality upper-level (above 150 meters from ground) wind resource to a greater degree.

As compared to a super high power wind generating set, the first and the second wind generating sets 31, 32 of the present invention are more reliable, and a generator, a gearbox and a control system are simpler and more stable.

When the first and the second wind generating sets 31, 32 of the present invention are connected in series, such technical problems that are involved with a large diameter blade as flexivity of blade being overly large and blade tip stalling due to the increase in diameter of blades of a high power wind generating set are reduced, thus increasing rotating speed of the blade and improving usage efficiency of wind resource.

As compared to a super high power wind generating set, the first and the second wind generating sets 31, 32 of the present invention are stressed dispersedly, and the bending moment of the present invention is smaller by using a balanced bending moment technology. Meanwhile, the first and the second wind generating sets 31, 32 rotate in opposite direction, so the overall torque during high speed operation can be completely eliminated theoretically; the load on the cylindrical foundation 1 of the wind power generating device 100 of the present invention is simpler.

As compared to a conventional wind power generating device, the wind power generating device 100 of the present invention can multiply the power of the wind generating set without increasing unit cost, thus improving usage of wind resource.

While preferred embodiments of the present invention are described above, the present invention is not limited thereto. Several particular examples are illustrated herein to explain the principle and embodiments of the present invention. The description of the above embodiments is provided only to help understand the methods and the core ideas of the present invention; meanwhile, many modifications can be made to the particular embodiments and applicable areas by those skilled in the art according the ideas of the invention. In summary, the content of the description should not be construed as limiting the invention.

The invention claimed is:

1. A wind power generating device, comprising:
a tower column;
a first wind generating set installed at a position on the tower column within a predetermined distance from a top, of the tower column, the first wind generating set that generates a first torque on the tower column during rotation for power generating; and
at least one second wind generating set installed at a position on the tower column below the first wind generating set, wherein the at least one second wind generating set generates a second torque on the tower column during rotation for power generating, and the second torque at least partially counteracts with the first torque;
a bearing causing a mechanical connection between the at least one second wind generating set and the tower column;
an electrical brush causing an electrical connection between the at least one second wind generating set and a cable inside the tower column; and
a yawning system causing the at least one second wind generating set to rotate around the tower column toward any direction.

2. The wind power generating device according to claim 1, further comprising:
a cabin of the at least one second wind generating set including an upper portion with a service hole for entry of maintainers.

3. The wind power generating device according to claim 1, wherein the tower column is a type of liftable tower column by means of which heights of the first wind generating set and the at least one second wind generating set are adjusted.

4. The wind power generating device according to claim 1, wherein the at least one second wind generating set is installed at a middle position of the tower column, and the first wind generating set and the at least one second wind generating set rotate in opposite directions.

5. The wind power generating device according to claim 4, further comprising: a balancer having a counterweight, the balancer balancing an operational bending moment of the wind power generation device by controlling a position of the counterweight.

6. The wind power generating device according to claim 4, wherein a gravity center of the first wind generating set is located in proximity of a tail portion of a cabin, and the gravity center of the at least one second wind generating set is located in proximity of a head portion of the cabin.

7. The wind power generating device according to claim 1, further comprising: the yawing system controls the directions of the first wind generating set and the at least one second wind generating set, where the yawing system controls a gravity center of the wind power generating device to deviate towards a direction of a coming wind when the first wind generating set and the at least one second wind generating set are shut down.

8. The wind power generating device according to claim 7, further comprising: a hub of the first wind generating set controlled to be located on a leeward face of the tower column; and
a hub of the at least one second wind generating set controlled to be located on a Windward face of the tower column.

9. The wind power generating device according to claim 7, wherein hubs of the first wind generating set and the at least one second wind generating set are both located on a leeward face of the tower column or a windward face of the tower column, and interference between blades of the first wind generating set and the at least one second wind generating sets is reduced by synchronously controlling rotation of the blades of the first wind generating set and the at least one second wind generating set.

10. The wind power generating device according to claim 1, wherein the tower column is installed on a cylindrical foundation, and the cylindrical foundation is a circular or polygonal complex cylindrical foundation or a combined structure of a plurality of complex cylindrical foundations.

11. The wind power generating device according to claim 10, wherein a vibration absorbing mat for absorbing and isolating vibratory energy is provided between the tower column and the cylindrical foundation and/or between the first wind generating set and the at least one second wind generating sets and the tower column.

12. The wind power generating device according to claim 10, wherein the cylindrical foundation is at least partly submerged into water, an interior of the cylindrical foundation including a plurality of tanks, inner and outer surfaces of which are provided with various pressure sensors, and cabin pressure of at least a portion of the plurality of tanks is adjusted automatically according to signals of the pressure sensors, so as to keep the balance of the cylindrical foundation.

* * * * *

UNITED STATES PATENT AND TRADEMARK OFFICE
CERTIFICATE OF CORRECTION

PATENT NO.        : 8,952,558 B2                                             Page 1 of 1
APPLICATION NO.   : 13/386793
DATED             : February 10, 2015
INVENTOR(S)       : Aidong Li et al.

It is certified that error appears in the above-identified patent and that said Letters Patent is hereby corrected as shown below:

In the Claims:
Claim 8, Col. 8, line 41 should read:
trolled to be located on a windward face of the tower Claim 9, Col. 8, line 48 should read:
generating set and the at least one second wind generating set Signed and Sealed this
Twenty-sixth Day of May, 2015

Michelle K. Lee
*Director of the United States Patent and Trademark Office*